United States Patent [19]

Van Moss, Jr.

[11] 4,130,994
[45] Dec. 26, 1978

[54] ARTIFICIAL REEF TO PREVENT SHORELINE EROSION

[76] Inventor: John H. Van Moss, Jr., 3 Mavor La., Highland Park, Ill. 60035

[21] Appl. No.: 801,049

[22] Filed: May 27, 1977

[51] Int. Cl.² ............................................... E02B 3/00
[52] U.S. Cl. ........................................ 405/24; 405/27
[58] Field of Search ........................................... 61/1-6

[56] References Cited

U.S. PATENT DOCUMENTS

| 3,022,632 | 2/1962 | Parks | 61/3 |
| 3,846,990 | 11/1974 | Bowley | 61/5 |
| 4,006,598 | 2/1977 | Hulsemann | 61/4 X |

FOREIGN PATENT DOCUMENTS 2252009  6/1975  France ............................................ 61/4

Primary Examiner—Jacob Shapiro
Attorney, Agent, or Firm—Rummler & Snow

[57] ABSTRACT

This invention relates to means to produce an artificial reef or floating breakwater wherein a series of buoyant disks are strung on a buoyant flexible line in spaced relation to each other with the lower end of the line being tethered to its own anchor. These tethered disks are placed preferably in about 6 to 18 feet water depth from the shoreline. A series of these disk-anchors are strung along in or out of lines paralleling the shoreline and in various depths of water to provide effective grid means for eliminating or at least substantially reducing the erosion effect along shorelines resulting from wave action.

The placement of the disk-rope anchor units is preferably in the water paralleling the shoreline and each unit is spaced apart from the other. However, the spacing is not critical but to accomplish the results sought to be achieved, the spacing ought to be close enough to be effective and yet not tangle with each other.

Also, several rows of the units may be employed in staggered relationship with each row, and the units may be removed at will.

5 Claims, 8 Drawing Figures

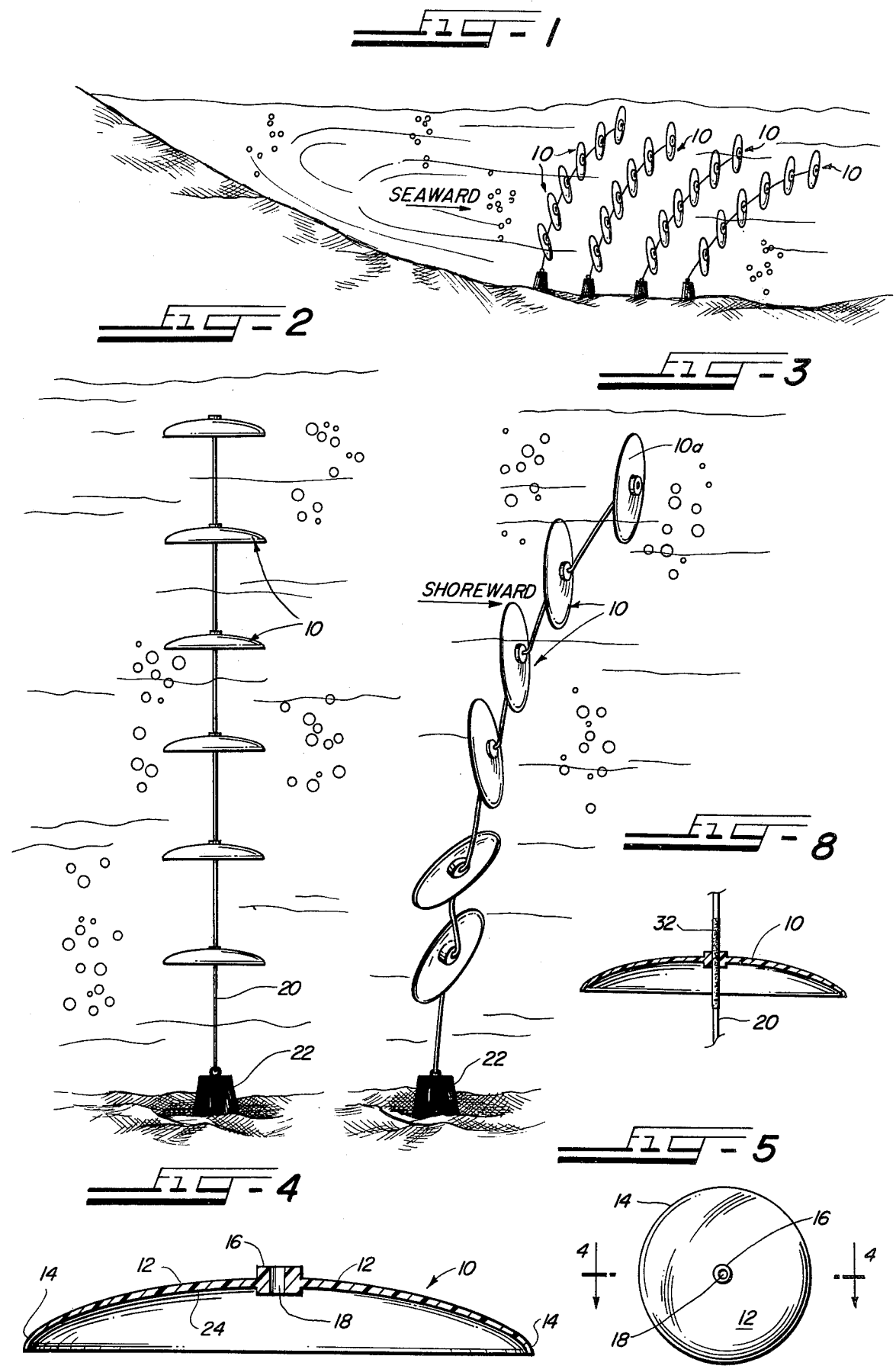

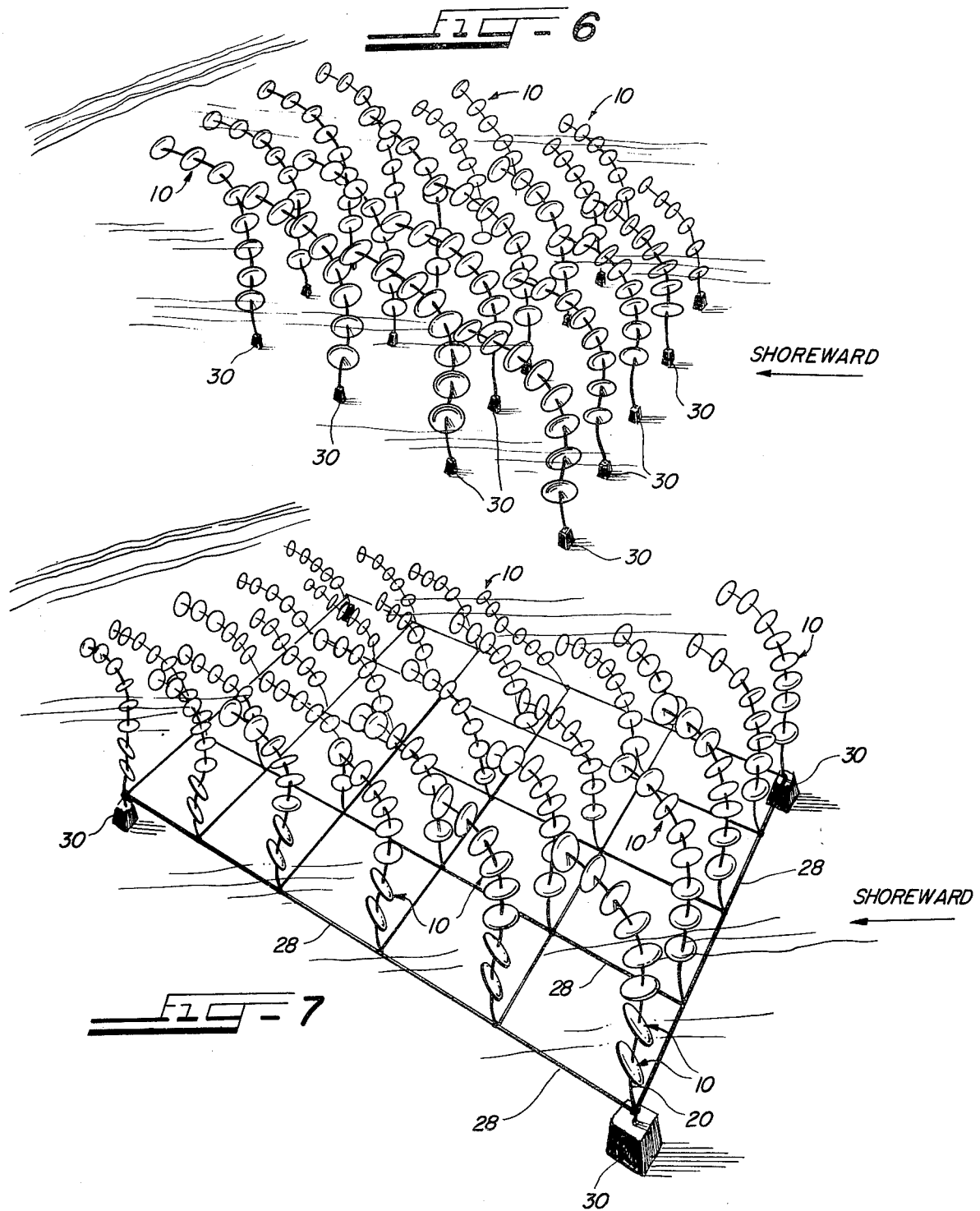

ARTIFICIAL REEF TO PREVENT SHORELINE EROSION

BACKGROUND OF THE INVENTION

Waves are generated at sea or on lakes by virtue of the frictional drag exerted on the water surface by the wind whereby the small waves originally generated gradually build up to larger waves to form a pattern which progresses towards the shore. It has been determined that the water particles making up the wave travel in a circular or elliptical orbit and that the diameter of the orbits at the water surface equals the height of the wave. Furthermore, it has been determined that the diameter of the orbit at a depth of about half the wave length is only about four percent of the orbital diameter at the water surface. Thus substantially all of the kinetic energy of the wave is concentrated at or near the water surface and the percentage of wave kinetic energy located at a given water depth rapidly decreases with water depth. Thus a water barrier located near the water surface and which extends toward the sea bottom a depth of about one-half the expected wave length can be highly effective in diminishing the wave kinetic energy.

Further, it is believed that fifty percent of the shoreline sand particles are moved by wave action (particularly winter storm waves) and fifty percent by the littoral currents on a year around basis.

Further attempts have been made to stop beach erosion by reducing wave energy and preventing the undertow from withdrawing the sand of the beach back into the water but no known successful attempt has been made. A search has been conducted in Class 61, subclasses 1, 3-6, inclusive, and the following art has been found:

U.S. Pat. No. 3,276,210—Stitt
U.S. Pat. No. 3,465,528—Usab
U.S. Pat. No. 3,628,334—Coleman
U.S. Pat. No. 3,673,805—Szyfter
U.S. Pat. No. 3,691,774—Hard
U.S. Pat. No. 3,777,689—Olsen et al.
U.S. Pat. No. 3,842,606—Stiles et al.
U.S. Pat. No. 3,846,990—Bowley
U.S. Pat. No. 3,848,419—Bowley However, none of these patents disclose applicant's novel disclosure and they are primarily directed to floating devices either on or near the surface of the water, while the present invention is positioned substantially wholly under the water with the uppermost disk positioned at the water surface.

SUMMARY OF THE INVENTION

A series of buoyant curved disks spacedly positioned on a buoyant rope or flexible line, which rope is tethered adjacent the bottom of the sea, and such combination of disks, ropes and tethers being positioned in the sea preferably in depths from 6 to 18 feet of water from the shoreline in any form of grid to provide control of water movement throughout the full water column even though the water particles are moving in more than one direction. The combination may be in or out of a line running parallel to the shoreline to:

1. Reduce the energy of waves.
2. Reduce the energy of sub-surface contents.
3. By placing the plurality of disk-rope-anchor combination at various depths, a continuing resistance is created to the movement of the water particles.
4. The breakwater effect is omni-directional.
5. The disks form protection for smaller forms of sea life.
6. By using the invention, it is of very low cost compared to solid breakwaters.
7. It is easily movable or removable as desired.

BRIEF DESCRIPTION OF THE DRAWINGS

FIG. 1 is a perspective view showing the device of the present invention anchored in the water and lying parallel with the shore and showing the undercurrent moving seaward.

FIG. 2 is a side elevational view of the disks-line-anchor in still water.

FIG. 3 is a plan view showing the position of the disks of the present invention on one line in the position they would assume with the waves moving shorewards and undercurrents moving out to sea.

FIG. 4 is a cross-sectional view taken on the line 4—4 of FIG. 5.

FIG. 5 is a top elevational view of one of the disks.

FIG. 6 is a plan view of a grid of disks-rope-tether.

FIG. 7 is a modified form of grid.

FIG. 8 is a view showing the adhesive connection between the disc and line.

DESCRIPTION OF THE PREFERRED EMBODIMENT

The disk 10 as shown in the drawing is waterproof and is buoyant and molded preferably from polyurethane foam 15–20 pounds per foot to the third power, and comprises an arcuate shape main body portion 12 with the free margins bent downwardly as at 14 in a taper. It takes on an inverted saucer-like shape. (See FIG. 4.) The vertically positioned axial sleeve or hub 16 extends above the upper face of the member 12 and below its lower face, as clearly shown in FIG. 4. The hub 16 is provided with an axial through aperture 18. The flexible line or waterproof rope 20 extends through the aperture 18 of disk 10. One or more disks 10 are threaded thereon. The lower end of line 20 is tethered to an anchor 22.

The medial opening 18 is preferably about 13/32 inches in diameter. Thus a line 20 having a diameter of about ½ inch or slightly larger could be inserted through the aperture 18 and retained on the line in any position thereon as desired by a frictional fit. Thus the diameter of the line used will determine the size of the perforation 18 and such perforation shall be slightly smaller in diameter than the diameter of the line.

Also, if desired, after the disks are spacedly placed on the line, a waterproof adhesive 32 can be injected into the center of the line above and below the hub of the disk and the line area of the disk at the point of connection of the disk, a firm bond between the disk and the line being obtained.

Each disk 10 is preferably about 18 inches in diameter and the total height is preferably about 2¼ inches measured from the margins 14 of the disk 10 to the upper edge of the sleeve 16. The hub 16 is preferably about 1¼ inch in diameter. The portion of the disk adjacent the hub 16 is preferably about ½ inch thick.

A series of spaced disks 10 is positioned on the line 20 and spaced preferably about 2 feet apart. The lower end of the line 20 is tethered to a heavy mooring block 22 at the bottom of the water column and resting on the sea or lake bottom to provide an anchor for the disk-rope unit, while the uppermost disk is positioned at the water surface.

The number of disks 10 strung on the rope 20 is wholly dependent on the depth of the water column where they are to be placed. Thus preferably, in a 6 foot depth of water, only two disks would be strung on line 20 at 30 inches apart, while in 18 feet of water depth, there would be seven disks 10 strung on the line at 30 inches apart. Thus, in about 12 foot water depth, four disks 10 would be strung on line 20 at about 30 inches apart. The distance between the anchor and the disk immediately thereabove is also spaced about 30 inches.

One of the features of the present invention is that the disks 10 are spaced on the line 20 and extend above the bottom of the sea to the surface of the water, and, of course, depending on the depth of the water, disks 10 are spaced on the line approximately every 30 inches between the uppermost disk and the lowermost disk. Thus the disks are all free to pivot about their sleeves 16 (as shown in FIG. 3), and in any direction from the horizontal depending on the movement of the water below the surface current, the intermediate current or the bottom currents. However, the tendency of the unit is always to return to the vertical with the disks in a horizontal plane because of the buoyancy of the disks when the water is still, as shown in FIG. 2.

If a series of disk-line-anchor units is placed in two or more rows substantially paralleling the shoreline but in staggered relationship from each row, then, of course, the water currents will impinge upon several disks, both to substantially dampen the waves and to protect the sand particles from going out to sea and eroding the shoreline on the undercurrent flow towards the sea.

In FIG. 3, the unit is shown placed in water at about a 15 foot depth and the waves and water currents moving toward the shoreline. The arrows show the direction of movement of the water. It is noted the upper disk 10a is positioned below the water surface. Each of the disks 10 of the unit is shown tilted about each of the respective sleeves 18 and because of the dished shape of the under side 24 of the disks 10 at the upper end, the currents tend to be retarded to dampen the wave velocity and thus help to prevent shoreline erosion, unusual undercurrents and pounding wave action.

In FIG. 1, the current direction is reversed from that shown in FIG. 3, namely the currents are returning to the body of water taking with them sand particles. When the water strikes the disk surfaces 24, the sand particles therein will tend to drop to the sea bottom thus building a natural seawall or barrier or breakwater.

It is believed that the mass of water below the surface of the water generally moves or rolls in the same direction as the wave at a distance of 18 feet to 20 feet from the shoreline or even at a greater distance in a heavy storm. Thus the disks 10, being extremely buoyant, would tend to shift about the respective hubs 18 whereby the inner surface 24 would tend to break the force of energy created by the roll from and tend to suppress the wave forces.

When the wave breaks on the beach, the movement of the water is returned seaward taking with it sand particles to erode the beach. By the impingement of the sand particles on the surface 24 of the disks, which have been tilted by the action of the water so that surface 24 is facing shoreward, the sand particles tend to fall to the bottom of the sea creating a natural sea wall.

It should be obvious that disk-line-anchor may be readily removed and placed elsewhere.

Also, because of the buoyancy of the disks, boats may readily pass thereover or the hulls may push the disks sideward, all without either interfering with the progress of the boat or destroying the artificial reef of this invention.

FIG. 6 shows a grid of anchor-rope-disks spaced in the bottom of the water. In this type grid, each anchor is deposited on the sea bottom spaced about 6 feet apart from each other.

In FIG. 7, a modified grid is shown wherein anchors 26 are placed at the four corners making up the grid and tether lines 28 stretched between four anchors 30. The ropes or lines 20 and spaced disks 10 are tethered to the anchors 26 and lines 28 approximately 6 feet apart from each other. With this kind of grid, a great saving in the cost of providing individual anchors is achieved.

When waves are present in bodies of water moving shoreward, the upper surface current of the water will tend to impinge against the surface 24 of the upper disks 10 to help retard the breaking of the waves while simultaneously the water at the bottom will flow in the opposite direction because it is at most times following the contour of the bottom thus causing the lowermost of the disks 10 to have the inner face 24 facing the opposite way from the upper disks to allow the floating sand particles to abut thereagainst and fall to the bottom. During relatively quiet wave action, the intermediate disks 10 will tend to the horizontal because the movement of intermediate currents is almost nil while the surface currents and the bottom currents will assume the position shown in FIG. 3.

This system is designed to operate primarily along coastal tidewater and Great Lakes shores with wave heights of less than 6 feet. However, it is believed this invention will still be functional in coastal areas where storm waves exceed 6 feet. Also, in rivers at flood stage, this invention could be quickly installed to protect levees from extreme water pressure.

Although but one specific embodiment of this invention is herein shown and described, it will be understood that details of the construction shown may be altered or omitted without departing from the spirit of the invention as defined by the following claims.

I claim:

1. A grid for controlling shoreline erosion by controlling the water movement throughout the full water column each part making up the grid comprising a series of buoyant curved disks, each disk having an arcuate body with the free margins bent downwardly in a taper, and said disk provided with an axial hollow hub, a flexible line on which said disks are spacedly secured, an anchor, one end of said line tethered to said anchor while the uppermost disk on the line is positioned at the water surface, whereby the uppermost disks tend to break up surface currents while the lowermost disks are responsive to the bottom currents.

2. The device according to claim 1 wherein the disks are strung on the line through the hub, and a fluid adhesive is impregnated in the line about and in the area of the hub to anchor the disks to the line in spaced relation to each other.

3. The device according to claim 2 wherein disks are molded of polyurethane foam 15-20 pounds per foot to the third power.

4. The device of claim 1 wherein the disks have a diameter of eighteen inches.

5. The device of claim 4 wherein the disks are spacedly positioned on the line at about thirty inches apart.

* * * * *